United States Patent [19]

Swope et al.

[11] Patent Number: 5,213,866
[45] Date of Patent: May 25, 1993

[54] FIBER REINFORCEMENT OF CARPET AND TEXTILE COATINGS

[75] Inventors: Ronald L. Swope, Ringgold, Ga.; Cheri L. McConnell, Kimball; Larry S. Fulton, Hixson, both of Tenn.

[73] Assignee: National Starch and Chemical Investment Holding Corporation, Wilmington, Del.

[21] Appl. No.: 964,190

[22] Filed: Oct. 21, 1992

[51] Int. Cl.$^5$ .................... B32B 33/00; B05D 1/12; C08J 5/04
[52] U.S. Cl. ...................... 428/95; 427/180; 427/389.9; 427/394; 428/96; 428/97; 524/561; 524/562
[58] Field of Search ............. 427/180, 389.9, 394; 428/95, 96, 97; 524/561, 562

[56] References Cited

U.S. PATENT DOCUMENTS

| | | | |
|---|---|---|---|
| 3,642,516 | 2/1972 | Gassway et al. | 428/229 |
| 3,819,462 | 6/1974 | Starr et al. | 428/93 |
| 3,963,850 | 6/1976 | Doss et al. | 428/286 |
| 4,009,310 | 2/1977 | Scobbo | 428/95 |
| 4,086,381 | 4/1978 | Cheshire et al. | 428/113 |
| 4,654,247 | 3/1987 | Randall, III et al. | 428/95 |
| 4,737,386 | 4/1988 | Wotier et al. | 427/389.9 |
| 4,756,714 | 7/1988 | Hendrix et al. | 8/115.6 |
| 4,849,267 | 7/1989 | Ward et al. | 428/41 |
| 4,866,119 | 9/1989 | Mudge | 524/510 |
| 5,013,787 | 5/1991 | Barron et al. | 524/555 |
| 5,026,765 | 6/1991 | Katz et al. | 524/561 |

FOREIGN PATENT DOCUMENTS 754901 8/1974 South Africa.

Primary Examiner—William J. Van Balen
Attorney, Agent, or Firm—Mary E. Porter; Edwin M. Szala

[57] ABSTRACT

Carpet and textile coating compositions are formulated to include fiber or flock pieces so as to improve the tuft pull strength and dimensional stability of the carpet or textile. The coating compositions comprise 10 to 70%, by weight, of a latex binder and 30 to 90%, by weight, of at least one filler, wherein the filler comprises about 0.001 to 100%, by weight, of fiber or flock pieces. Any natural or synthetic fiber may be used in the coating compositions of this invention.

21 Claims, No Drawings

FIBER REINFORCEMENT OF CARPET AND TEXTILE COATINGS

BACKGROUND OF THE INVENTION

This invention provides carpet and textile coating compositions comprising natural or synthetic fibers as a filler. These compositions are useful in the construction of carpets or textiles having improved physical strength characteristics. The fiber is used in place of all or part of the inorganic fillers that are typically added to carpet and textile coating compositions. The fiber reinforced coating compositions strengthen the carpet or textile, particularly when the coating compositions are used at relatively low application weights.

The use of fibers in elastomeric polymer foam backing sheets that are preformed on a release substrate and then released and bonded to a textile material substrate is disclosed in Republic of South African Patent No. 7504901, issued May 24, 1976 to Deogon, et al.

The use of fibers to reinforce carpet and textile back coating compositions has never been reported.

As used herein, the term "textile" refers to woven pile fabric of the type commonly used in furniture and automobile upholstery and in draperies. Textile also includes other pile-type woven and non-woven fabrics, such as corduroy, used in clothing and other finished goods. The woven pile fabrics have an extra set of warp or filling yarns interlaced with the basic woven fabric such that loops or cut ends are produced on the surface of the fabric. The pile woven fabrics must be back-coated with an adhesive or a binder coating so that the pile will remain in the fabric during subsequent processing of the fabric, and during laundering, wearing and use of the fabrics. However, as used herein, "textile" does not include fabrics constructed with a separate, preformed, foam backing that is bonded to the back of the woven pile.

As used herein, "coating composition" refers to adhesives, binders, lattices, and the like, as well as their aerated or foamed equivalents. Coating compositions suitable for a variety of carpet and textile applications are disclosed in U.S. Pat. Nos. 4,654,247, issued Mar. 31, 1987, to Randall III, et al.; 4,737,386, issued Apr. 12, 1988, to Wotier, et al.; 4,756,714, issued Jul. 12, 1988, to Hendrix, et al.; 4,866,119, issued Sept. 12, 1989, to Mudge; 5,013,787, issued May 7, 1991, to Barron, et al.; and 5,026,765, issued Jun. 25, 1991, to Katz, et al., which are hereby incorporated by reference.

SUMMARY OF THE INVENTION

We have found that carpets and textiles having improved tuft pull strength, dimensional stability, processing stability and durability may be manufactured by using coating compositions that comprise 30 to 90% filler, and, on a filler dry weight basis, from about 0.001 to 100% by weight, of fiber or flock pieces having a length of less than about 2.54 cm (1.0 inches). The fibers are used in place of all or part of a filler, such as calcium carbonate, in the coating compositions. Suitable coating compositions also comprise about 10 to 70%, by weight, of at least one latex binder, and may comprise various optional ingredients, such as thickeners, pigments, frothing aids, and the like.

Fibers useful in such coating compositions include natural and synthetic fibers used in the manufacture of textiles and carpets, as well as other fibers, such as ceramic fiber or carbon fiber used in other types of products. The fiber is preferably in the form of a flock such as nylon fiber flock, paper flock, cotton flock, and jute fiber flock, such as are commonly generated as waste product during the manufacture of carpet and textiles. The fiber may be wetted with a surfactant prior to formulation of the coating composition. The fiber is preferably added to a thickener and the thickener/fiber mixture is then added to the coating composition.

DESCRIPTION OF THE PREFERRED EMBODIMENTS

Coating Compositions

Coating compositions suitable for use herein include all coating compositions known in the art for use in the manufacture of textiles and carpets of a unitary and secondary construction. Suitable coatings include adhesives and binders that are applied to the back of the carpet or textile in liquid form and permitted to dry so as to bind the pile or tufts to the primary fabric backing. In general, the coating compositions are used to impregnate the loosely assembled web of yarn tufts which remain after weaving, tufting, fusion bonding or cutting of woven tufts to form a pile, followed by moderate heating or other processing to dry and cure the back-coating. The particular backcoating composition and the method of application will vary depending upon the type of carpet or textile to be coated and the end-use intended for the carpet or textile.

For example, a unitary construction carpet usually requires different amounts of filler and different levels of fiber than secondary construction carpet because unitary carpets are glued to the floor and tend not to stretch during use. Dimensional stability, or resistance to ongoing stretch of the carpet after the carpet has been laid, is a desirable attribute of quality carpeting. Thus, in secondary construction, or residential type carpeting, a higher level of fiber and filler in the backcoating composition will be selected so as to improve dimensional stability as well as tuft pull strength. In secondary construction carpeting, a backcoating is applied to the woven pile construction, then a second woven fabric backing (typically jute) is applied, together with a second application of the backcoating composition.

The coating compositions may be utilized at various solids levels, depending on the method of application, product being produced, and the like, however, the coating formulations are usually used at relatively high solids levels. In a preferred embodiment, the coating composition has a total solids content of 50 to 99%, most preferably 70 to 85%, by weight. Likewise, although any viscosity suitable for the particular application may be selected, in a preferred embodiment, a Brookfied viscosity of about 1,000 to 100,000 cps, most preferably 10,000 to 20,000 cps, is employed.

Preferred backcoating compositions contain about 10 to 70% by weight latex binder and about 30 to 90% by weight filler. If desired, other conventional additives may be incorporated into the coating compositions in order to meet various product specifications. Such additives include thickeners, catalysts, dispersants, pigments or colorants, biocides, antifoaming agents, froth aids, and the like.

In a preferred embodiment, the coating compositions are prepared from styrene butadiene rubber latex binders, or ethylene vinyl acetate resin latex binders.

Suitable fillers include ground calcium carbonate, clay or kaolin, aluminum trihydrate, barium sulfate, feldspar, whiting, and the like. In a preferred embodiment, a ground calcium carbonate is used at about 30 to 90%, on a dry weight basis, of the coating composition, most preferably at 50 to 80%.

The coating compositions of this invention contain about 0.001 to 100%, on a filler dry weight basis, of at least one type of fiber in lieu of the filler. In a preferred embodiment, about 1 to 10% of the filler is replaced with fiber, most preferably about 5% of the filler is replaced with fiber.

Fiber

For use in automated high-speed, commercial production of carpets and textiles, the length of the fiber pieces is critical. Elongated pieces averaging about 0.6 cm (one-quarter inch) are preferred. The length of individual pieces is not critical, and lesser amounts of longer and shorter fibers are acceptable for use herein, provided that a majority of the fiber pieces are less than about 1.27 cm (about one-half inch) in length.

While longer fiber pieces are generally preferred for strength, during commercial production of carpet and textile the longer fiber pieces will tend to clog the machinery used to mix and apply the coatings and slow down production. Fiber length is particularly important when the coating compositions are aerated prior to application to the carpet or textile. Because a longer fiber gives a better bridge over the knot where the tuft or loop of yarn meets the primary fabric backing, the longer fiber pieces will give higher strength tuft pull characteristics. Thus, one skilled in the art will select the longest fiber pieces suitable for use in a particular manufacturing operation.

Fibers suitable for use herein include any natural or synthetic fibers known in the art. Preferred fibers are those natural or synthetic fibers that are typically used in the manufacture of carpets and textiles. In particular, fiber flock waste materials that are a byproduct of carpet and textile manufacturing are preferred for use herein. Such fiber byproduct includes flock from cotton, wool, linen, cellulose acetate, nylon, rayon, polyethylene, polypropylene and polyester, and mixtures thereof. In addition, other types of fibers and flock such as cellulose fiber in the form of paper flock, carbon fiber of the sort used in graphite reinforced composites, elongated clays, and silica fibers used in reinforcing various materials may be employed herein. Non-elongated materials, such as fumed silicate, and other high surface area bulking materials, are not suitable for use in this invention.

The fibers are preferably wetted with a surfactant to facilitate blending of the fiber with the remainder of the coating composition.

The fibers may be dried after treating with surfactant before they are dispersed in the coating composition. One skilled in the art will select the best surfactant suitable for use in wetting the fibers for dispersion in aqueous media. Suitable surfactants include, but are not limited to, sodium lauryl sulfate, nonyl phenyl ethoxylated ethanol and caprylic acid-based surfactants.

Carpet Coating

In preparing a tufted carpet, the yarn is tufted or needled into a primary backing which is generally woven or non-woven polypropylene, polyethylene, polyester or jute. If a secondary backing is used, it is generally formed of woven or non-woven materials similar to those used as the primary backing and applied directly to the wet pre-coated primary backing prior to the drying step or applied with a separator adhesive to the dried pre-coated primary backing. Such a secondary backing provides dimensional stability to the carpet. The secondary backing may also be formed of a foam polymer or copolymer. Suitable foam compositions include urethane polymers, polymers and copolymers of styrene butadiene, ethylene, propylene, isobutylene, and vinyl chloride. When a foam secondary backing is used, it may be prefoamed and then laminated onto the primary backing, or the composition may contain a thermally activatable blowing agent and may be foamed immediately prior to lamination or after lamination. Additionally, the secondary backing may exhibit thermoplastic adhesive properties of its own, and the secondary backing can be preheated prior to lamination to render the surface thereof adhesive. Alternatively, the secondary backing may comprise a hot melt, one or more fused polyvinyl chloride plastisol layer(s) or bitumen, often in conjunction with a fiberglass scrim or other scrim known to provide dimensional stability. It is also contemplated that the coating composition disclosed herein for use as the primary backing may be used as the secondary backing.

In forming a non-tufted carpet, the carpet coating is generally thickened to a viscosity of about 25,000 to 100,000 cps and applied to a scrim surface. The carpet yarn fibers are then directly embedded into the wet coating using conventional techniques and then dried. Again, a secondary coating similar to that described above is desirably employed.

The coating penetrates the fibers of the carpet yarns to yield adhesion, fiber bundle integrity and anti-fuzzing properties. The coating that has been fiber-reinforced exhibits particularly excellent tuft-bind properties. The term "tuft-bind" refers to the ability of the coating to lock and secure the pile yarn tufts to the primary backing and is determined by measuring the amount of force required to physically pull a tuft free from the primary backing. Additionally for the purposes herein, tuft-bind is also used to include the superior characteristics needed in non-tufted coatings wherein the adhesion of the fiber pile is achieved solely by the backing. Suitable tuft-bind properties can be achieved by applying an amount of coating ranging from about 12 ounces per square yard to about 50 ounces per square yard (dry basis), which results in a carpet having a tuft-bind value of at least 10 pounds force, and, preferably, a tuft-bind value of 20 pounds force or greater.

Textile Coating

The fiber-containing coating compositions may be applied to textiles by any means known in the art. Suitable techniques include application of an aerated coating composition by a direct or roller application of aerated or non-aerated coating compositions. Any of the doctoring devices used in the art of coating may be used to meter or control coating weight. The doctoring devices include knife blade, air blade, transfer roll, gravure roll, and roll doctoring.

After application of the coating, the textile is subjected to a drying and curing stage. One skilled in the art may select the appropriate time-temperature relationships for this stage, such as are known in the art for various coating compositions.

The following examples are given to illustrate the invention, and are not intended to limit the invention. In the examples, all parts are by weight unless otherwise indicated.

EXAMPLE 1

A carpet coating compound was prepared with a styrene butadiene rubber latex, calcium carbonate filler, and ALCOGUM® TSB thickener in amounts shown in Table I, below. The coating was adjusted to a viscosity of 4000–5000 centipoise and a total solids content of 72% with the addition of water. In experimental samples, various fibers were used to replace some of the filler.

The compound samples were coated onto level loop tufted carpet at 30 ounces per square yard and the test carpet was placed in a forced air oven (138° C.) for 30 minutes. The carpet samples were allowed to cool to room temperature for 24 hours, then tuft bonds were tested.

The tuft bonds of the carpet sections were measured by employing the standard test method for tuft bind of pile floor coverings, ASTM D-1335-67. The method consisted of measuring the force required to pull a loop from the carpet section. The required load or force is reported in pounds-force (lbf). For the control carpet section, a 25.17 lbf was required to pull a loop from the backing of the carpet. For the experimental carpet sections, a 26.05 and a 25.94 lbf force was required to pull a loop from the carpet backing. This represents a 3.50 and a 3.06 percent increase in tuft bind for the sections of the carpet treated by the method of the invention versus the control carpet section. Therefore, even when the coating is used at relatively high amounts for commercial production (i.e., 30 oz./sq. yd.) the fiber provided a measurable improvement in tuft pull strength.

TABLE I

COATING COMPOSITIONS

| Ingredient | Parts by Weight | | |
|---|---|---|---|
| | Control | A | B |
| Styrene Butadiene Latex[a] | 178.57 | 178.57 | 178.57 |
| Water | 18.65 | 18.65 | 18.65 |
| Calcium Carbonate Filler[b] | 150.00 | 149.00 | 149.00 |
| Ceramic Fiber[c] | — | 1.00 | — |
| Nylon Fiber[d] | — | — | 1.00 |
| ALCOGUM® TSB Thickener[e] | 1.64 | 1.16 | 1.48 |
| Viscosity (cps) | 4820 | 4340 | 4540 |
| Tuft Pull (lbs)[f] | 25.17 | 26.05 | 25.94 |

[a]RIC 69727 latex was obtained from Reichhold Chemicals, Inc., Research Triangle Park, North Carolina.
[b]Grade 200D filler was obtained from Georgia Marble, Dalton, Georgia.
[c]Fiberfrax® HSA Fiber of about 0.6 cm in length, was obtained from Carborundum Company, Fibers Division, Niagra Falls, New York.
[d]Nylon Fiber was chopped fiber nylon carpet waste obtained from a carpet manufacturer (non-uniform pieces of about 0.6 cm in length).
[e]ALCOGUM TSB thickener was obtained from Alco Chemical Company, Chattanooga, Tennessee.
[f]The carpet was a level loop carpet of a unitary construction type. The coating was applied to the carpet at 30 oz./sq. yd.

Tuft pull test results show that the use of a back coating composition containing nylon or ceramic fibers in lieu of calcium carbonate filler improved carpet strength.

EXAMPLE 2

A second type of carpet coating compound was prepared with styrene butadiene latex and other components in the amounts shown in Table II, below. The coating was adjusted to a viscosity of 17,100–17,800 cps and applied to level loop tufted carpet at 20 oz./sq. yd. Carpet samples were treated and tested as in Example 1.

TABLE II

CARPET COATING COMPOSITIONS

| Ingredient | Parts by Weight | | | | |
|---|---|---|---|---|---|
| | Control | C | D | E | F |
| Styrene Butadiene Latex[a] | 188.68 | 188.68 | 188.68 | 188.68 | 188.68 |
| DURA-BOND® H Adhesive[b] | 8.0 | 8.0 | 8.0 | 8.0 | 8.0 |
| Calcium Carbonate Filler[c] | 200.0 | 199.0 | 199.0 | 199.0 | 199.0 |
| Cotton Flock[d] | — | 1.0 | — | — | — |
| Paper Towel Flock[d] | — | — | 1.0 | — | — |
| Paper Bag Flock[d] | — | — | — | 1.0 | — |
| Nylon Flock[d] | — | — | — | — | 1.0 |
| Jute Color[e] | .1 | .1 | .1 | .1 | .1 |
| Froth Aid CF 1885-A[f] | 2.79 | 2.79 | 2.79 | 2.79 | 2.79 |
| ALCOGUM® TSB Thickener[g] | 14.16 | 13.63 | 13.03 | 13.80 | 9.49 |
| Viscosity (cps) | 17,800 | 17,100 | 17,900 | 17,800 | 17,400 |
| Tuft Pull (lbs)[f] | 11.48 | 17.51 | 18.92 | 17.89 | 19.67 |

[a]Dow 8300 latex was obtained from Dow Chemical Company, Midland, Michigan.
[b]DURA-BOND H adhesive was obtained from National Starch and Chemical Company, Bridgewater, New Jersey.
[c]Grade D-90 filler was obtained from Georgia Marble, Dalton, Georgia.
[d]Flock fibers included chopped cotton fibers; chopped paper towel that was pulped in a Waring Blender; brown paper bag that was chopped and pulped in a Waring Blender; and chopped Nylon fiber waste obtained from a carpet manufacturer. Substantially all of each type of flock fiber was less than about 0.6 cm in length.
[e]Jute color was obtained from Standard Adhesive, Dalton, Georgia.
[f]The carpet was a level loop tufted carpet of a unitary construction type. The coating was applied to the carpet at 20 oz./sq. yd. The coating was aerated with 30% air prior to coating the carpet.

The tuft pull test results show significant increases in carpet strength in samples containing fiber.

EXAMPLE 3

A textile coating composition is prepared with acrylic/vinyl acrylic latex and other components in the amounts shown in Table III below.

TABLE III

TEXTILE COATING FORMULATIONS

| Ingredient | Parts by Weight | |
|---|---|---|
| | A-Test | B-Control |
| Latex[a] | 200.0 | 200.0 |
| Propylene Glycol | 6.0 | 6.0 |
| Dispersant[b] | 0.4 | 0.4 |
| Titanium Dioxide[c] | 10.0 | 10.0 |
| Zinc Oxide | 2.0 | 2.0 |
| Mildewcide[d] | 2.5 | 2.5 |
| Alcogum® L-11 thickener[e] | * | * |
| Water | * | * |
| Ammonium Hydroxide[f] | * | * |
| Nylon Fiber[g] | 1.0 | — |

[a]DUR-O-CRYL® 429 latex is obtained from National Starch and Chemical Company, Bridgewater, New Jersey.
[b]Nopcosperse® dispersant is obtained from Henkel Corporation, Charlotte, North Carolina.
[c]Ti-Pure® R-900 titanium dioxide is obtained from Dupont, Wilmington, Delaware.
[d]Troysan® AF-1 Mildewcide is obtained from Troy Corporation, East Hanover, New Jersey.
[e]A thickener is obtained from Alco Chemical Company, Chattanooga, Tennessee.
[f]Sufficient ammonium hydroxide is added to adjust the pH to 8.5 to 9.0.
[g]Nylon fiber is chopped fiber nylon, a carpet waste material obtained from a carpet manufacturer (non-uniform pieces of about 0.6 cm in length).

In each textile coating formulation the of formulations is adjusted to a Brookfield RVF (#5 spindle/20 rmp) viscosity of 8000–9000 cps by adjusting quantities of water, thickener and ammonium hydroxide. The total solids is 50%–55%.

The coating is applied to a woven textile fabric at 2–3 oz/sq yd dry add-on. The coated fabric is dried at 121°

C. (250° F.) and cured at 149° C. (300° F.) for 3 minutes. The fabric samples are tested for tear-resistance using ASTM 2261 method. The fiber reinforced coating provides at least a 10% increase in force required to rip the treated fabric, compared to control fabric coated with a control binder that does not contain the fiber.

We claim:

1. Carpet coating compositions comprising 10 to 70% by weight of a latex binder, and 30 to 90% by weight of at least one filler, wherein the filler comprises about 0.001 to 100% by weight of fiber pieces having a length less than about 2.5 cms.

2. The carpet coating compositions of claim 1, wherein the compositions further comprise at least one filler other than the fiber pieces, the filler being selected from the group consisting of ground calcium carbonate, clay, aluminum trihydrate, barium sulfate, feldspar and combinations thereof.

3. The carpet coating compositions of claim 1, wherein the compositions further comprise at least one thickener.

4. The carpet coating compositions of claim 1, wherein the fiber is selected from the group consisting of nylon fiber, ceramic fiber, carbon fiber, paper fiber, cotton flock, paper flock, jute fiber, and natural and synthetic fibers used in the manufacture of textiles and carpets.

5. The carpet coating compositions of claim 1, wherein the latex binder is a styrene butadiene rubber latex or an ethylene vinyl acetate resin.

6. The carpet coating compositions of claim 1, wherein the fiber is wetted with a surfactant prior to addition to the coating composition.

7. The carpet coating compositions of claim 3, wherein the fiber is added to the thickener prior to addition to the coating composition.

8. The carpet coating compositions of claim 1, wherein the filler comprises about 5%, by weight, fiber.

9. A method for improving the strength and dimensional stability of carpet, comprising the steps:
   a. fabricating carpet from a plurality of yarn loops or tufts inserted into a backing; and
   b. coating the backing with a coating composition comprising 10 to 70% by weight of a latex binder, and 30 to 90% by weight of at least one filler, wherein the filler comprises about 0.001 to 100% by weight of fiber pieces having a length less than about 2.54 cm.

10. The method of claim 9, wherein the carpet is characterized by a tuft pull strength of at least 20 pounds when the coating composition is used at an application of 20 ounces per square yard.

11. Textile coating compositions comprising 10 to 70% by weight of a latex binder, and 30 to 90% by weight of at least one filler, wherein the filler comprises about 0.001 to 100% by weight of fiber pieces having a length less than about 2.54 cm.

12. The textile coating compositions of claim 11, wherein the compositions further comprise at least one filler other than the fiber pieces, the filler being selected from the group consisting of ground calcium carbonate, clay, aluminum trihydrate, barium sulfate, feldspar and combinations thereof.

13. The textile coating compositions of claim 11, wherein the compositions further comprise at least one thickener.

14. The textile coating compositions of claim 11, wherein the fiber is selected from the group consisting of nylon fiber, ceramic fiber, carbon fiber, paper fiber, cotton flock, paper flock, jute fiber, and natural and synthetic fibers used in the manufacture of textiles and carpets.

15. The textile coating compositions of claim 11, wherein the latex binder is a styrene butadiene rubber latex or an ethylene vinyl acetate resin.

16. The textile coating compositions of claim 11, wherein the fiber is wetted with a surfactant prior to addition to the compositions.

17. The textile coating compositions of claim 13, wherein the fiber is added to the thickener prior to addition to the coating composition.

18. A method for improving the strength of pile textiles, comprising the steps:
   a. fabricating pile textiles from a plurality of yarn loops or tufts inserted into a backing; and
   b. coating the backing with a coating composition comprising 10 to 70% by weight of a latex binder, and 30 to 90% by weight of at least one filler, wherein the filler comprises about 0.001 to 100% by weight of fiber pieces having a length less than about 2.54 cm.

19. The method of claim 18, wherein the textiles are characterized by at least a 10% increase in tear resistance compared to an identical coating composition prepared without fiber.

20. A carpet having improved strength and dimensional stability prepared by a method comprising the steps:
   a. fabricating carpet from a plurality of yarn loops or tufts inserted into a backing; and
   b. coating the backing with a coating composition comprising 10 to 70% by weight of a latex binder, and 30 to 90% by weight of at least one filler, wherein the filler comprises about 0.001 to 100% by weight of fiber pieces having a length less than about 2.54 cm.

21. A pile textile having improved strength prepared by a method comprising the steps:
   a. fabricating pile textiles from a plurality of yarn loops or tufts inserted into a backing; and
   b. coating the backing with a coating composition comprising 10 to 70% by weight of a latex binder, and 30 to 90% by weight of at least one filler, wherein the filler comprises about 0.001 to 100% by weight of fiber pieces having a length less than about 2.54 cm.

* * * * *